United States Patent
Nishimura et al.

(10) Patent No.: US 10,755,425 B2
(45) Date of Patent: Aug. 25, 2020

(54) AUTOMATIC TUNING OF IMAGE SIGNAL PROCESSORS USING REFERENCE IMAGES IN IMAGE PROCESSING ENVIRONMENTS

(71) Applicant: Intel Corporation, Santa Clara, CA (US)

(72) Inventors: Jun Nishimura, San Jose, CA (US); Timo Gerasimow, San Jose, CA (US); Sushma Rao, Sunnyvale, CA (US); Chyuan-Tyng Wu, San Jose, CA (US); Aleksandar Sutic, Santa Clara, CA (US); Gilad Michael, Tzur Yizhak (IL)

(73) Assignee: INTEL CORPORATION, Santa Clara, CA (US)

( * ) Notice: Subject to any disclaimer, the term of this patent is extended or adjusted under 35 U.S.C. 154(b) by 19 days.

(21) Appl. No.: 16/116,318

(22) Filed: Aug. 29, 2018

(65) Prior Publication Data

US 2019/0043209 A1  Feb. 7, 2019

Related U.S. Application Data

(60) Provisional application No. 62/626,455, filed on Feb. 5, 2018.

(51) Int. Cl.
*G06T 7/33* (2017.01)
*H04N 5/213* (2006.01)
(Continued)

(52) U.S. Cl.
CPC .............. *G06T 7/337* (2017.01); *G06T 5/001* (2013.01); *G06T 5/50* (2013.01); *H04N 5/213* (2013.01);
(Continued)

(58) Field of Classification Search
CPC ........... G06T 7/337; G06T 5/001; G06T 5/50; G06T 2207/10024; G06T 2207/20208;
(Continued)

(56) References Cited

U.S. PATENT DOCUMENTS

| 8,384,796 B2 * | 2/2013 | Zhang | H04N 9/735 |
| | | | 348/222.1 |
| 2015/0029353 A1 * | 1/2015 | Sinn | H04N 5/23229 |
| | | | 348/222.1 |

(Continued)

OTHER PUBLICATIONS

Nishimura, "Automatic ISP Image Quality Tuning Using Nonlinear Optimization" 2018 25th IEEE International Conference on Image Processing (ICIP) Oct. 2018.*

(Continued)

*Primary Examiner* — Juan A Torres
(74) *Attorney, Agent, or Firm* — Jaffery Watson Mendonsa & Hamilton LLP

(57) ABSTRACT

A mechanism is described for facilitating automatic tuning of image signal processors using reference images in image processing environments, according to one embodiment. A method of embodiments, as described herein, includes one or more processors to: receive images associated with one or more scenes captured by one or more cameras; access tuning parameters associated with functionalities within an image signal processor (ISP) pipeline; generate reference images based on the tuning parameters, wherein a reference image is associated with an image for each functionality within the ISP pipeline; and automatically tune the ISP pipeline based on selection of one or more of the reference images for one or more of the images for one or more of the functionalities.

21 Claims, 14 Drawing Sheets

(51) Int. Cl.
  *H04N 5/357* (2011.01)
  *H04N 5/232* (2006.01)
  *G06T 5/00* (2006.01)
  *G06T 5/50* (2006.01)

(52) U.S. Cl.
  CPC .......... *H04N 5/232* (2013.01); *H04N 5/23229* (2013.01); *H04N 5/357* (2013.01); *G06T 2207/10024* (2013.01); *G06T 2207/20208* (2013.01)

(58) Field of Classification Search
  CPC ........ H04N 5/232; H04N 5/213; H04N 5/357; H04N 5/23229
  USPC .......................................................... 382/195
  See application file for complete search history.

(56) References Cited

U.S. PATENT DOCUMENTS

2015/0201129 A1* 7/2015 Mak .................. G03B 5/00 348/208.5
2016/0379352 A1* 12/2016 Zhang ................ G06T 7/0002 382/157

OTHER PUBLICATIONS

Cheung, "Optimization-based Automatic Parameter Tuning for Stereo Vision" IEEE CASE Year 2015.*
Pfister, "Automatic parameter tuning for image denoising with learned sparsifying transforms" IEEE ICASSP Year 2017.*
Mittal, "Automatic Parameter Prediction for Image Denoising Algorithms using Perceptual Quality Features" Proc. SPIE 8291 Human Vision and Electronic Imaging XVII 82910G Year 2012.*
Zhang, "MOEA/D: A Multi-objective Evolutionary Algorithm Based on Decomposition" IEEE Trans. on Evolutionary Computation vol. 11 No. 6 pp. 712-731 Year 2007.*
Wong, "Turbo Denoising for Mobile Photographic Applications" IEEE ICIP Year 2016.*
Gharbi, "Deep Joint Demosaicking and Denoising" Proceedings of ACM SIGGRAPH Asia 2016 vol. 35 No. 6 Nov. 2016.*
Mernik, On clarifying misconceptions when comparing variants of the Artificial Bee Colony Algorithm by offering a new implementation vol. 291 pp. 115-127 Jan. 2015.*
Wang, "Multi-Scale Structural Similarity for Image Quality Assessment" IEEE Asilomar Conference on Signals Systems and Computers Year 2003.*

* cited by examiner

AUTOMATIC TUNING OF IMAGE SIGNAL PROCESSORS USING REFERENCE IMAGES IN IMAGE PROCESSING ENVIRONMENTS

CLAIM TO PRIORITY

This Patent Application claims the benefit of and priority to U.S. Provisional Patent Application No. 62/626,455, entitled AUTOMATIC IMAGE QUALITY TUNING USING NONLINEAR OPTIMIZATION, by Jun Nishimura, et al., filed Feb. 5, 2018, the entire contents of which are incorporated herein by reference.

FIELD

Embodiments described herein relate generally to data processing and more particularly to facilitate automatic tuning of image signal processors using reference images in image processing environments.

BACKGROUND

Given the hundreds of high-level tunable parameters of an image signal processor (ISP), tuning of ISP typically requires a great deal of efforts. For example, in conventional techniques, ISP and its high-level tunable parameters are tuned manually by image quality (IQ) engineers, which can take several weeks for an engineer to be concerned with a single ISP to deliver imaging solutions to various customers.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
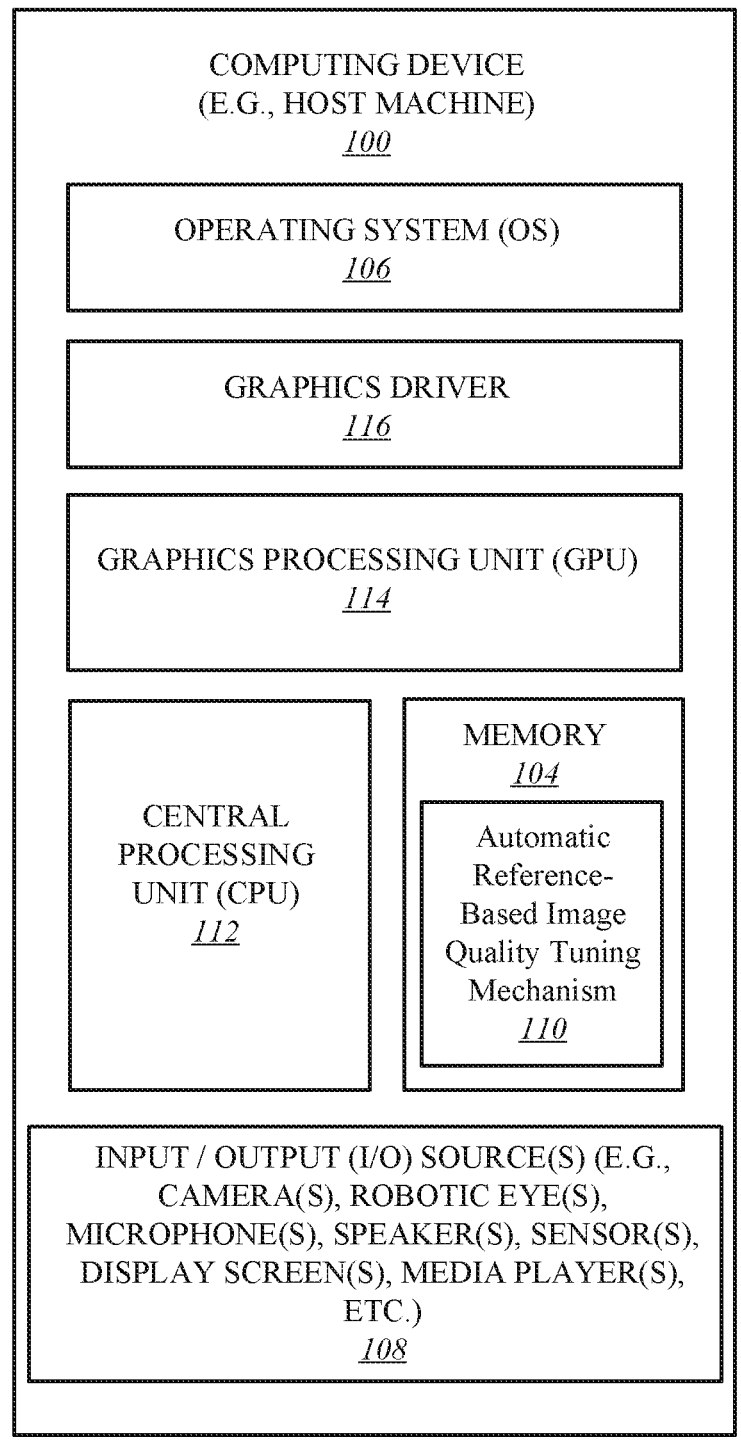
FIG. 1 illustrates a computing device employing an automatic reference-based image quality tuning mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for tuning of ISPs for quality of images using non-linear optimization such that IQ tuning settings are automatically provided for customers, such as low-tiered customers. Embodiments are also useful in setting initial tuning starting points for high-tiered customers with strong IQ preferences.

An ISP (also referred to as "media processor", "MP", "image processor", "IP") may refer to a specialized digital signal processor (DSP) that is employed to be used for image processing in digital cameras, computing devices, etc. It is contemplated and to be noted that the terms "reference" and "reference image" are used interchangeably throughout this document.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing an automatic reference-based image quality tuning mechanism ("reference-based tuning mechanism") 110 according to one embodiment. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, or the like, as well as input/output (I/O) sources 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", and "mechanism" may include, by way of example, software or hardware and/or a combination thereof, such as firmware.

In one embodiment, as illustrated, reference-based tuning mechanism 110 may be hosted by memory 104 in communication with I/O source(s) 108, such as microphones, speakers, etc., of computing device 100. In another embodiment, reference-based tuning mechanism 110 may be part of or hosted by operating system 106. In yet another embodiment, reference-based tuning mechanism 110 may be hosted or facilitated by graphics driver 116. In yet another embodiment, reference-based tuning mechanism 110 may be hosted by or part of graphics processing unit ("GPU" or simply graphics processor") 114 or firmware of graphics processor 114. For example, reference-based tuning mechanism 110 may be embedded in or implemented as part of the processing hardware of graphics processor 114. Similarly, in yet another embodiment, reference-based tuning mechanism 110 may be hosted by or part of central processing unit ("CPU" or simply "application processor") 112. For example, reference-based tuning mechanism 110 may be embedded in or implemented as part of the processing hardware of application processor 112.

In yet another embodiment, reference-based tuning mechanism 110 may be hosted by or part of any number and type of components of computing device 100, such as a portion of reference-based tuning mechanism 110 may be hosted by or part of operating system 106, another portion may be hosted by or part of graphics processor 114, another portion may be hosted by or part of application processor 112, while one or more portions of reference-based tuning mechanism 110 may be hosted by or part of operating system 116 and/or any number and type of devices of computing device 100. It is contemplated that embodiments are not limited to certain implementation or hosting of reference-based tuning mechanism 110 and that one or more portions or components of reference-based tuning mechanism 110 may be employed or implemented as hardware, software, or any combination thereof, such as firmware.

Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
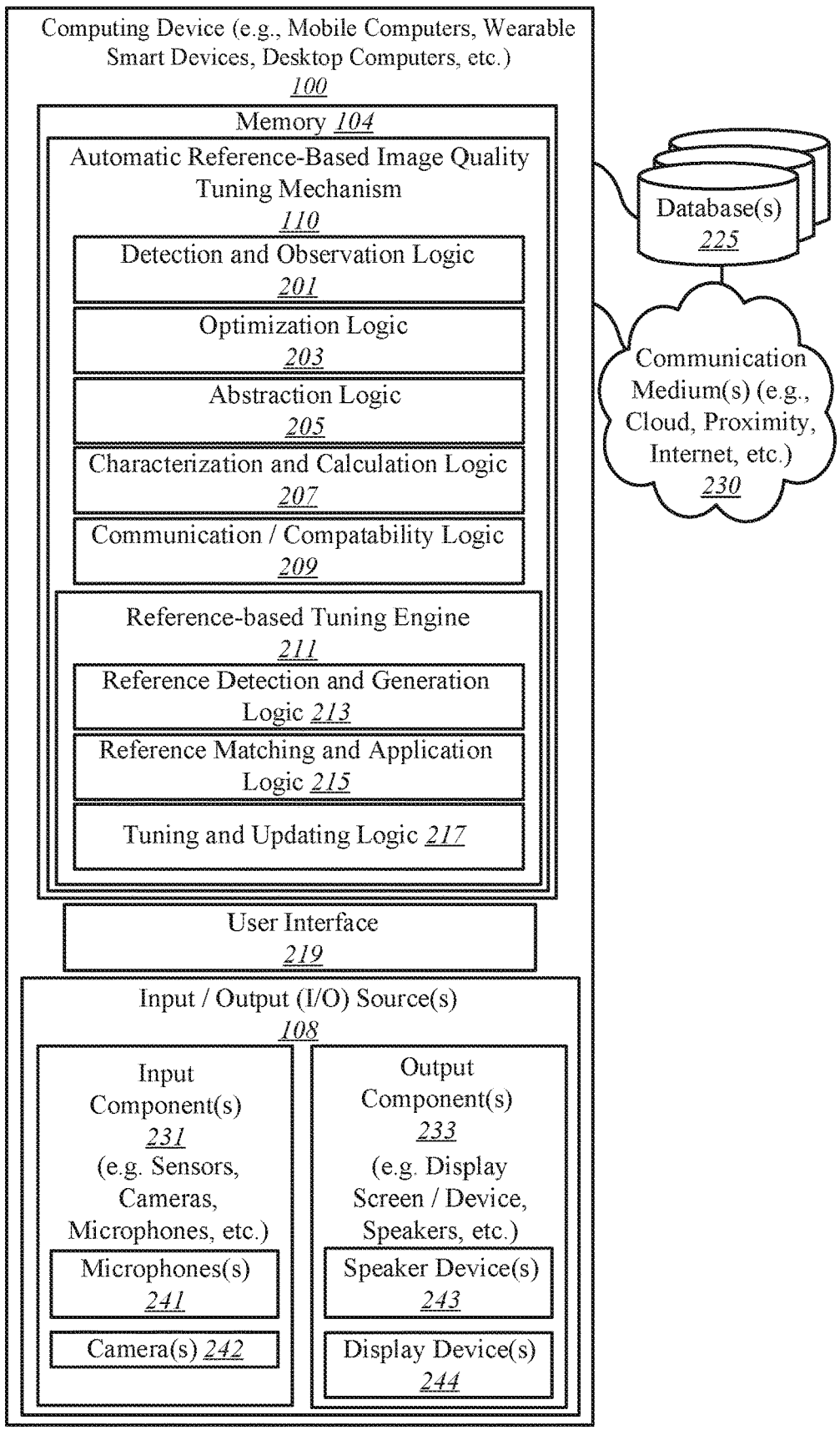
FIG. 2 illustrates an automatic reference-based image quality tuning mechanism according to one embodiment.

FIG. 2 illustrates automatic reference-based image quality tuning mechanism 110 of FIG. 1 according to one embodiment. For brevity, many of the details already discussed with reference to FIG. 1 are not repeated or discussed hereafter. In one embodiment, reference-based tuning mechanism 110 may include any number and type of components, such as (without limitations): detection and observation logic 201; optimization logic 203; abstraction logic 205; characterization and calculation logic 207; communication/compatibility logic 209; and reference-based tuning engine 211 including reference detection and generation logic ("detection and generation logic") 213, reference matching and application logic ("matching and application logic") 215, and tuning and updating logic 217.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", and "mechanism" may include, by way of example, software or hardware and/or a combination thereof, such as firmware. For example, logic may itself be or include or be associated with circuitry at one or more devices, such as application processor 112 and/or graphics processor 114 of FIG. 1, to facilitate or execute the corresponding logic to perform certain tasks, such as visual description circuitry may itself be or facilitate or execute visual description logic 203 to perform visual description-related operations (such as computing LBP).

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

It is contemplated that embodiments are not limited to any number or type of microphone(s) 241, camera(s) 243, speaker(s) 243, display(s) 244, etc. For example, as facilitated by detection and observation logic 201, one or more of microphone(s) 241 may be used to detect speech or sound simultaneously from users, such as speakers. Similarly, as facilitated by detection and observation logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or a video stream.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

As previously mentioned, conventional techniques require high-level of efforts in tuning ISPs as it is rather tedious to tune hundreds of high-level tunable parameters in modern ISPs, which are often tuned manually by IQ engineers. For example, it can take up to a week to get a single ISP pipeline to deliver any imaging solutions to various customers. Further, it is contemplated that each project can have several ISP pipelines to tune for different use cases and resolution configurations. This problem has been a major bottleneck for companies to increase the number of design wins for their low-tiered customers.

Although there are several conventional techniques for addressing these issues, such conventional techniques are cumbersome, manual, and tedious, and consequently, they are inefficient and prone to human errors. For example, multi-objective optimization may be used to stochastically find optimal ISP tuning parameter using IQ key performance indicators (KPIs), such as sharpness, texture acutance, visual noise, resolution, etc., where ISP tuning parameters may be optimized to meet IQ KPIs. After the optimization, users can then go through the images to pick their preferences. Similarly, other conventional solutions are limited to specific algorithms and/or parameters, such as optimization of depth map using covariance matrix adaptation-evolution strategy (CMA-ES) global optimization algorithm, transformation of domain noise reduction algorithm, image enhancement using simple metric to tune single tuning parameters to stop sharpening, parameter prediction for noise reduction that is limited to only finding single sigma parameter for BM3D.

Further, since IQ KPIs do not impose any or enough constraints to image quality and artifacts, while optimization can easily result in images full of artifacts, and the same IQ KPIs can be achieved with subjectively unacceptable tunings. Further, algorithms allow for supporting more KPIs and giving results, but requiring users to spend many more hours to go through all images. It is also difficult to control the smoothness of pareto-fronts and thus there are often sudden big differences between various tuning suggestions without considering the tuning parameter smoothness between different sensor gains, where optimization can be susceptible to a dynamic range of KPIs.

Another failure case with conventional techniques is that non-smooth pareto-front output associated with the multi-objective optimization algorithm, such as optimization results using noise and texture metric, where each image from left to right corresponds to a different position along the pareto-front. For example, all the images along the pareto-front have unacceptable artifacts, which is the same as when IQ engineers only tune ISP using objective metrics. Further, first and second points along the pareto-front are so far apparat that there remains no other way to ensure smooth transitions. Another critical weakness from the approach that IQ KPIs only give overall aspect of image quality and there are many bad tunings that can achieve them better than subjectively acceptable things.

Embodiments provide for a novel technique for automatic referenced-based tuning of ISP as facilitated by referenced-based tuning mechanism 110, such as through hybrid (global and/or local) optimization of ISP tuning parameters, facilitated by optimization logic 203, using automatically-generated reference images. For example, by applying this novel technique, there can be significant reduction in image quality tuning efforts along with reduction in time needed to market and enable more design wins for camera and imaging solutions.

Embodiments provide for automatic ISP IQ tuning through one or more of nonlinear optimization, parameter abstraction, automatic reference generation, and fitness calculation. For example, camera module-specific calibration is performed as facilitated by detection and observation logic 201, where operations like black level, lens shading, linearization, and color correction are carried out.

In generating reference images, as facilitated by reference detection and generation logic 213, a reference image is different for each functionality block associated with an ISP/ISP pipeline. For example, nonlinear optimization, as facilitated by optimization logic 203, may be used to find an optimal set of tuning parameters that are then used to achieve output images with the best possible fitness measure against a corresponding reference image.

As will be further described in this document, parameter abstraction is performed, as facilitated by abstraction logic 205, to ensure all ISP functionality blocks are considered, including those that are exposing low level parameters. For example, 9×9 blur kernel coefficients may be efficiently abstracted with a single cut-off frequency parameter, wherein the parameter abstraction also allowed for normalizing the range of parameters to, for example, [0.0, 1.0] for easier interaction with nonlinear optimization. For automatically tuning an ISP pipeline, each ISP functionality block is sequentially optimized with its reference.

Embodiments are not limited to any ISP pipeline or its functionality blocks; however, for the sake of brevity and clarity, throughout this document, an ISP pipeline with at least the following functionality blocks is considered for automatic tuning: Bayer noise reduction, demosaic, YUV noise reduction, and sharpening. Such functionality blocks may be used to decide the overall ISP IQ and the significant amount of tuning effort that goes into it.

Regarding fitness calculation, as facilitated by characterization and calculation logic 207, for example, simple sum of absolute difference (SAD) between the output image and the reference images is used in different domains according to a target functionality block. Embodiments are not limited to SAD and other operations, such as structural similarity (SSIM), multi-scale SSIM (MS-SSIM) may also be used.

It is contemplated that achieve good IQ may be a matter of trade-off between different IQ aspects, such as for noise reduction, it is detail versus noise. To break the trade-off, multiple frames of static scene may be temporarily fused to generate a good reference for spatial noise reduction. Further, to reflect different customer IQ preferences, the number of frames, N, can be adjusted as follows:

$$I_{fusion} = 1/N \Sigma_{t=1}^{N} I_i(t)$$

where $I_i$ (t) is t-th input frame, where one can adjust blending weights of [0.0, 1.0] for 2 frames.

For example, for demosaic functionality, a reference red green blue (RGB) image and its corresponding Bayer image may be simulated by adding noise on linearized clean RGB image using a pre-calibrated noise model and applying Bayer subsampling.

Similarly, for sharpening functionality, a good trade-off may be necessitated between noise and sharpness. With temporal averaging, this trade-off may be broken, where an edge directed unsharp masking on a temporally average frame is used. For example, gradients, $G_{\{H,V\}}$, using a Scharr operator is used to calculated weight, $w=|G_H|/(|G_H|+|G_V|)$, followed by computation of directional details, non-direction details, Gaussian low pass filter, etc., leading to blending of components, as follows:

$$I_{ref} = I_{fusion} + \alpha \cdot \alpha_{ndir}(w_{ndir}D_{ndir} + (1-w_{ndir})D_{dir})$$

Where $w_{ndir} = \exp(-\min(G_H, G_V)^{2/\sigma_{ndir}^2})$ with $\sigma^{ndir} = 0.5$, and $\alpha_{ndir} = 1 - \exp(-K \otimes |D_{ndir}|/\sigma_\alpha^2)$, σ is calculated as mean+ standard deviation of $K \otimes |D_{ndir}|$ at flat region, K is 9×9 blur kernel, where α controls an overall sharpness.

Since ISP is not always differentiable by its tuning parameter, gradient-free nonlinear optimization, as facilitated by optimization logic 203, may be employed; however, embodiments are not limited as such a several other non-linear techniques for both global and local optimizations may be used. In one embodiment, global and local optimizations may be combined through initialization of local optimization and global optimization results. For example, a first stage of optimization may carry out the global optimization to explore a high dimensional tuning parameter search space for good candidates of reference images. At a second stage, local optimization may be carried out to refine the good candidates to further observe them for even better fitness measurements.

Further, for example, to interact with tuning parameters, parameter abstraction is added, as facilitated by abstraction logic 205. Firstly, this technique normalizes the range of each tuning parameter to [0.0, 1.0] for easy handling in various nonlinear optimization techniques. Secondly, some ISP tuning parameters may be too low level with unnecessary flexibility, since the search space may be highly non-convex, such as to reduce the degree of freedom. For example, in some embodiments, a technique like Artificial Bee Colony (ABC) may be used for performing global optimization to explore good ability and applicability to numerous practical matters, while being simple, stable, and not requiring complex parameter tuning. Similarly, a subplex technique may be used for local optimization for high dimensional search, where the search space is decomposed into low dimensional subspaces, while applying other techniques, such as the Nelder-Mead Simplex technique.

In one embodiment, detection and observation logic 201 is used to perform a universal as well as selective detection, selection, and/or observation of data, ranging from detection of images, videos, etc., through camera(s) 242, etc., accessing pertinent data at database(s) 225, communicating with other computing devices including wearable devices, mobile devices, etc.

As will be further illustrated with reference to FIG. 3A, once the pertinent data is detected and/or observed by detection and observation logic 201, optimization logic 203 may be used to facilitated global and local optimizations, where global optimization may include searching for good candidates to serve as tuning parameters for ISP. For example, optimization logic 203 may use one or more algorithms or techniques, such as evolutionary algorithms like Artificial Bee Colony, to globally search or explore any high dimensional tuning parameter search space for good candidates to serve as tuning parameters for ISP. Similarly, in one embodiment, optimization logic 203 may be further used to facilitate local optimization that includes working with the candidates chosen or selected through global optimization and refine those candidates to further look for better fitness measurement.

As will be further described with embodiment, abstraction logic 205 may then be triggered to perform tuning parameter abstraction, such as for stable optimization, it is effective to perform normalization of tuning parameter range where the range of parameters is normalized to [0.0, 1.0] before sending the parameter to optimization logic 203 for use in global and/or local optimization. Other than stable optimization, abstraction logic 205 may be used to facilitate tuning flexibility abstraction where low level ISP parameters are abstracted to meaningful and non-redundant tuning parameters, such as the one illustrated in FIG. 3B.

In one embodiment, characterization and calculation logic 207 may be triggered to facilitate camera module characterization and fitness calculation. For example, camera module characterization may include performing camera module-specific calibration of ISP, such as black level, lens shading table, linearization, color correction calibration, etc., as facilitated by characterization and calculation logic 207. Similarly, characterization and calculation logic 207 may be used to facilitate fitness calculation to, for example, measure how similar an ISP block output is in comparison with a reference image.

Further, in one embodiment, reference-based tuning engine 211 may be employed to work with all other components, such as the ones described above, to facilitate the automatic reference-based tuning of ISP. For example, ISPs or ISP pipelines may be optimized by offering ideal reference images for each functionality of an ISP for facilitating automatic ISP tuning using ISP references as facilitated by reference-based tuning engine 211.

It is contemplated that certain tradeoff are made between different image quality aspects to achieve good-quality images, such as spatial noise reduction may be difficult because of the potential tradeoff between detail preservation and nose. However, in one embodiment, by controlling the raw capture or input, reference images may be created for each block and/or functionality in ISP as facilitated by reference detection and generation logic 213.

Figure 3A:
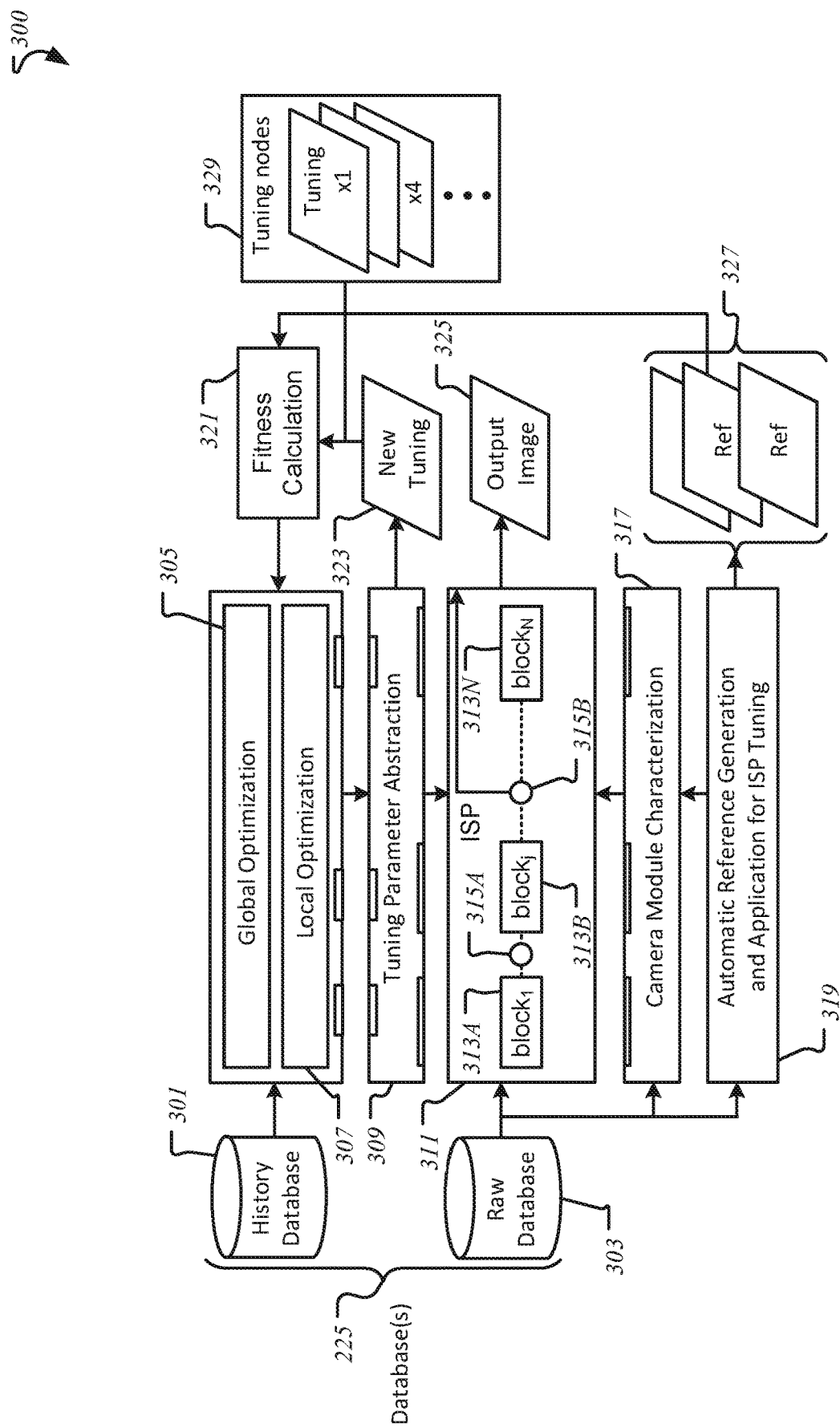
FIG. 3A illustrates a system for automatic reference-based ISP tuning according to one embodiment.
Figure 3B:
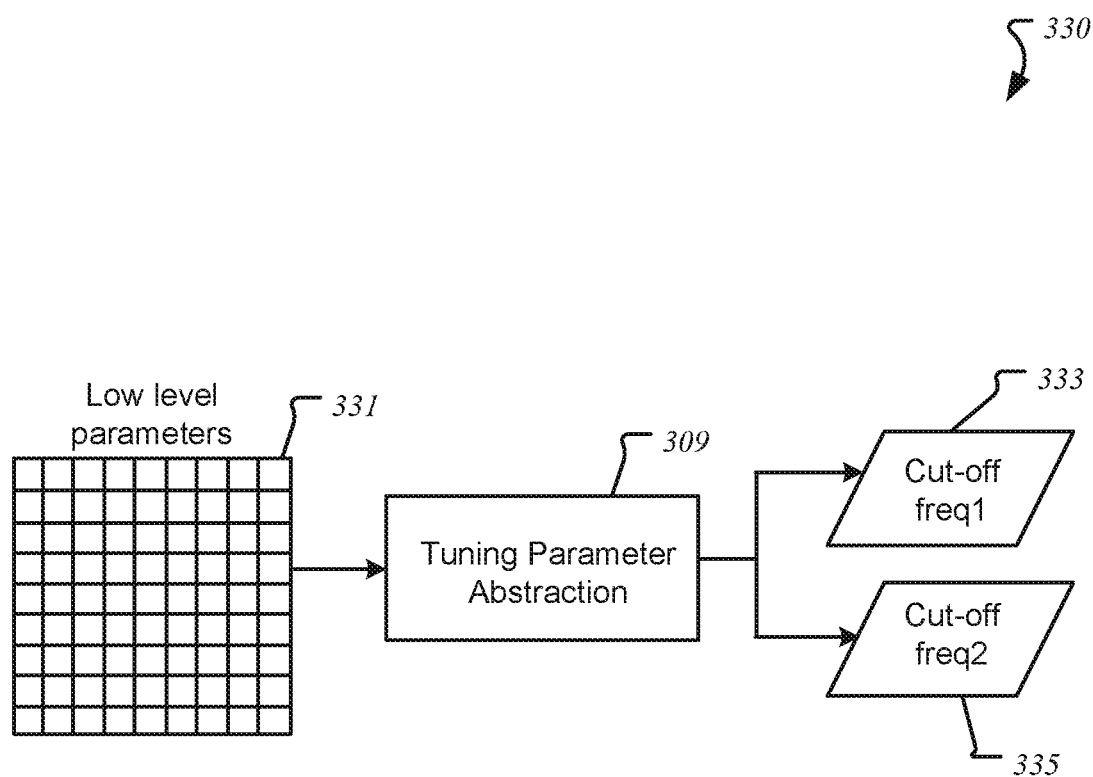
FIG. 3B illustrates a transaction sequence for parameter abstraction according to one embodiment.

For example, detection and generation logic 213 may be used to simply detect and access any relevant parameter or even images, including any historical parameters and/or reference images, that are already created and preserved in historical database of database(s) 225, as shown in FIG. 3A. If relevant parameters are found in database(s) 225, then a reference image is selected or accordingly generated by detection and generation logic 213 to reference matching and application logic 215 further processing. However, if a historical reference does not exist, then detection and generation logic 213 may be used to generate a reference image for use now as well as in the future.

Figure 3C:
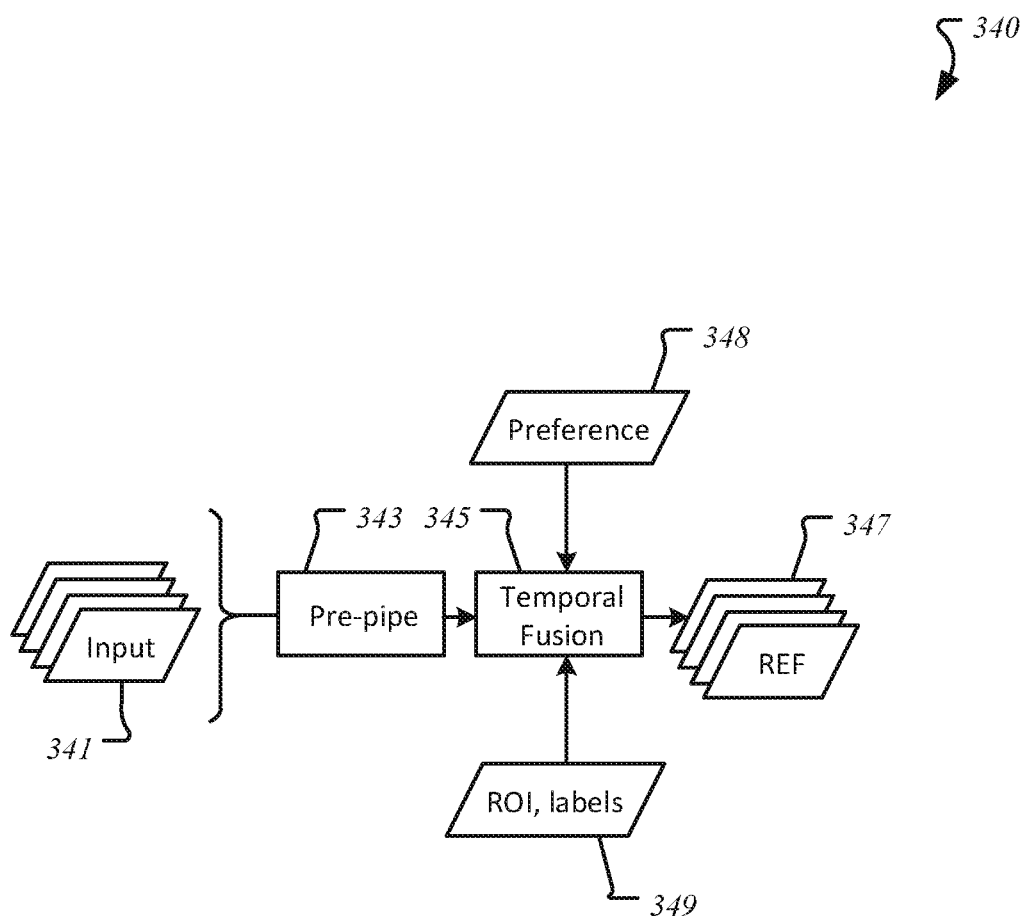
FIG. 3C illustrates a transaction sequence for reference generation for spatial noise reduction according to one embodiment.

In one embodiment, generating or creating a reference image, as facilitated by detection and generation logic 213, may include generating a reference for any spatial noise reduction form (e.g., luma, chroma, Bayer, etc.) by, for example, capturing static scenes using tripod to ensure no global motion, temporally fusing the image with different number of frames, and providing label and preference information about noise reduction strength on each area of the image (e.g., more noise reduction on flat) as shown with reference to FIG. 3C. Similarly, as shown with respect to FIG. 3D, a reference for any demosaic may be generated through calibration of noise and creation of reference red, green, blue (RGB) and its Bayer input. Further, any sharpening reference may be generated as shown FIG. 3E, where an input image and ensuring edge smoothness of any contrast are temporarily fused, extracting edge direction, gradients, edge mark, etc., to generate a reference for sharpening.

Once a reference is generated, it may then be applied to the process using reference matching and application logic 215 such that proper tuning of the ISP may be performed using tuning and updating logic 217. In some embodiments, in case of the availability of multiple existing or newly-generated references, reference matching and application logic 215 may be triggered to find the best reference candidate by matching the reference with the requirements for the reference such that the best reference is then selected to be applied to the process.

For example, part of matching, as facilitated by matching and application logic 215, may involve determination of convergence, such as seeking absolute different between an optimized output image and a reference image in, for example, an 8 bit scale. For example, as shown in Table 1, below, using the local and global optimizations, the local-multiple column represents the local optimization from multiple candidates obtained by the global optimization. For example, Table 1 shows 10 tries, local multiple results in best convergence (e.g., smallest difference with respect to reference) with significantly smaller convergence variance (e.g., last row of Table 1). Table 1 illustrates convergence comparison between global and global/local, as follows:

TABLE 1

| Try | Global | Local-Single | Local-Multiple |
|---|---|---|---|
| 1 | 1.201882 | 1.178419 | 1.175843 |
| 2 | 1.181577 | 1.175734 | 1.177464 |
| 3 | 1.202499 | 1.185771 | 1.175449 |
| 4 | 1.18401 | 1.178256 | 1.175882 |
| 5 | 1.191714 | 1.177296 | 1.176001 |
| 6 | 1.179355 | 1.177177 | 1.175971 |
| 7 | 1.199353 | 1.188766 | 1.176641 |
| 8 | 1.195575 | 1.174495 | 1.174658 |
| 9 | 1.19651 | 1.177722 | 1.174535 |
| 10 | 1.193701 | 1.179816 | 1.176526 |
| AVE | 1.192617 | 1.179345 | 1.175897 |
| VAR | 6.96E−05 | 2E−05 | 7.8E−07 |

Similarly, as facilitated by matching and application logic 215, fitness calculation may be performed by characterization and calculation logic 207 to be fed back to optimization logic 203 for optimization to measure the different between the current output and the reference provided on certain ROIs, where tuning parameter smoothness is considered as a regularization. For example, the overall fitness measure may be described as follows:

$$\text{Fitness} = [\text{diff btw input and reference}] + w * |\text{adjacent tuning node} - \text{current tuning}|$$

Further, for example, certain prior or historical information may be accessed at history database of database(s) 225 to be considered with respect to optimization, where this historical information may include previous tunings, tuning relating to certain parameters, effective tuning range of certain parameters, and the importance of each tuning parameter, and/or the like. Further, for example, a tuning node may be assigned certain parameters, protocols, or other similar characteristics to allow for tuning or adjusting of bands or levels within maintaining the bounds of such parameters and protocols. In one embodiment, once the reference is automatically generated or chosen and applied to the tuning process, tuning and updating logic 217 is then triggered to perform the reference-based automatic tuning of ISP, where upon tuning of the ISP, any tuning parameters are then updated by tuning and updating logic 217.

In one embodiment, once a good tuning is obtained from initial optimization, a user may wish to further refine the tuning by using optimization tuning parameters as the starting point based on user preferences (e.g., more noise on flat, more sharpness, etc.) and running local optimization processes, etc., where the user gets to load the automatically tuned parameters in their IQ tuning tool.

Figure 4A:
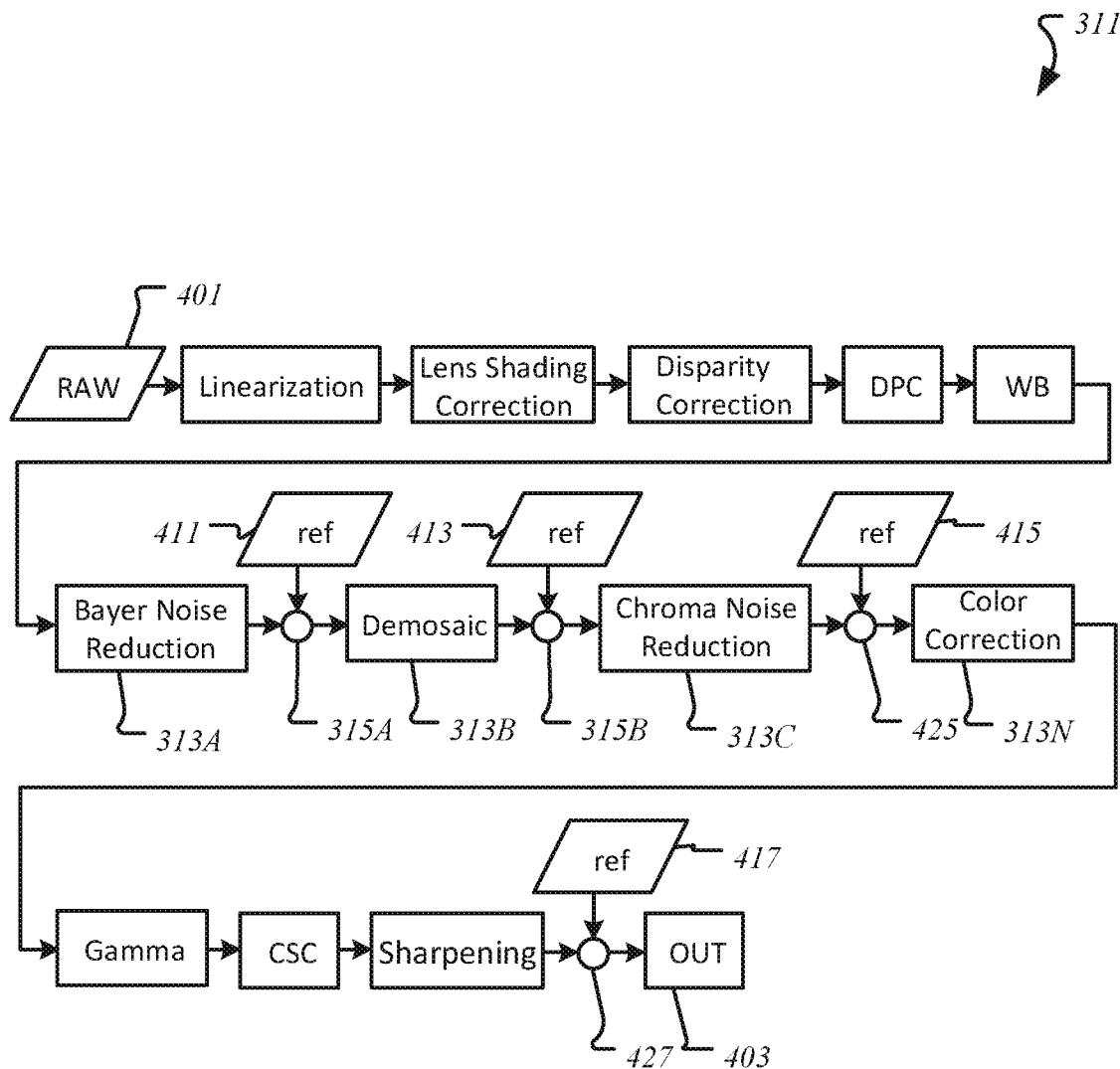
FIG. 4A illustrates an ISP pipeline according to one embodiment.

This novel technique for reference-based tuning of an ISP, as facilitated by referenced-based tuning mechanism 110, involves or employs global and local optimizations, tuning parameter abstraction, reference generation and/or selection, fitness calculation, etc., to automatically tune the ISP using the appropriate and applicable references. For example, an ISP may be optimized by providing ideal reference images for each functionality of the ISP for facilitating automatic ISP tuning by intermediate reference, as shown in FIG. 4A. Further, to enable this novel technique, in one embodiment, a pre-pipe and a post-pipe of an ISP may be constructed as shown with reference to FIG. 4B. It is contemplated and to be noted that terms like "ISP" and "ISP pipeline" are used interchangeably throughout this document.

Referring back to FIG. 2, input component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinemagraphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", "programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "reference", "reference generation", "image quality tuning", "ISP", "ISP pipeline", "ISP tuning", "optimizing", "abstracting", "characterizing", "calculating", "tuning", "updating parameters", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from reference-based tuning mechanism 110 to facilitate various embodiments including adding, removing, and/or enhancing certain features. For brevity, clarity, and ease of understanding of reference-based tuning mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

FIG. 3A illustrates an embodiment of a system 300 for automatic reference-based ISP tuning according to one embodiment. For brevity, many of the details previously discussed with reference to FIGS. 1-2 may not be discussed or repeated hereafter. Any processes or transactions with this and other illustrations may be performed by processing logic that may comprise hardware (e.g., circuitry, dedicated logic, programmable logic, etc.), software (such as instructions run on a processing device), or a combination thereof, as facilitated by reference-based tuning mechanism 110 of FIG. 1. Any processes or transactions associated with this and other illustrations may be illustrated or recited in linear sequences for brevity and clarity in presentation; however, it is contemplated that any number of them can be performed in parallel, asynchronously, or in different orders. Further, it is contemplated that embodiments are not limited to any system, component placement, or architectural setup, such as system 300.

The illustrated system 300 may be part of or employed at computing device 100 of FIG. 2, where the illustrated embodiment of system 300 hosts database(s) 225 including history database 301 and raw database 303. For example, history database 301 may be used to store or maintain historical data or information about ISP, etc., such as prior knowledge about ISP tuning, previous tuning settings, tuning parameters, effective tuning range of certain parameters, importance associated with tuning parameters, etc. In some embodiments, the process of automatic ISP tuning may be started with this historical data from history database 301, where raw database 303 may include and be used for accessing any amount and type of other data.

It is contemplated that ISP 311 refers to or include an image signal processor containing multiple blocks 313A, 313B, 313C, 313N, where, for example, dots 315A, 315B depict points of output within ISP, which may then be compared against reference images 327. In one embodiment, reference images 327 may be used to automatically tune ISP 311 or its tuning parameters so that its output image 325 is as close to one of reference images 327.

As previously discussed, global optimization 305 and local optimization 307 are facilitated by optimization logic 203 of FIG. 2, where global optimization 305 is used to search for suitable candidate tuning parameters, such as from history database 301 and/or raw database 303, associated with ISP 311 using one or more techniques, such as an evolutionary algorithm, to globally explore the high dimensional tuning parameter search space for good candidates. Similarly, local optimization 307 is used for candidates found through global optimization 305 to refine the candidates to further look for better fitness measurements. In one embodiment, fitness calculation 321, as facilitated by characterization and calculation logic 207 of FIG. 2, to measure how similar the ISP block output, such as output image 325, looks or is compared to one or more of reference images 327.

The illustrated system 300 further provides for camera module characterization 317, as facilitated by characterization and calculation logic 207 of FIG. 2, where camera module characterization 317 refers to performing a camera module-specific calibration of ISP 311, such as black level, lens shading table, linearization and color correction calibrations, etc. In one embodiment, ISP 311 is tuned for each image sensor gain (e.g., International Standards Organization (ISO) gain, discrete gains of ×1, ×2, etc.), where the tuning settings are referred to as tuning nodes 329.

In one embodiment, tuning parameter abstraction 309 is performed, as facilitated by abstraction logic 205 of FIG. 2, for achieving new tuning 323 through, for example, normalization of a tuning parameter range, while for stable optimization, it effectively normalizes the range of parameters to [0.0, 1.0] before sending the parameters for global and local optimizations 305, 307. Further, example, tuning parameter abstraction 309 achieves new tuning 323 through tuning flexibility abstraction such that low level ISP parameters are abstracted to meaningful and non-redundant tuning parameters. For example, as shown in transaction sequence 330 of FIG. 3B, if a sharpening block, such as block 331, contains 9×9 unsharp masking filter coefficients, then these parameters are abstracted, through tuning parameter abstraction 309, into two cut-off frequencies 333, 335 for band-pass filters.

Referring back to FIG. 3A, in one embodiment, system 300 allows for automatic reference generation and application 319 as facilitated by reference-based tuning engine 211, such as detection of parameters and generation of reference images 327 as facilitated by parameters detection and reference generation logic 213, and matching and application of references as facilitated by reference matching and application logic 215, and then tuning of ISP 311 and updating and storing of the parameters at history database 301 as facilitated by tuning and updating logic 217 of FIG. 2.

It is contemplated that other logic blocks may be added to reference-based tuning mechanism 110 of FIG. 2, such as a defect pixel correction (DPC) block, which removes hot and cold pixels to produce defect-free images, including raw images in some embodiments, a temporal noise reduction block for temporally fuse scenes, and one or more of linearization, disparity correction, and color correction blocks for handling linearization, disparity, and color correction, respectively, by calibration of camera module, and further, a high dynamic range (HDR) tone mapping block for handling tone and contrast dealing with ground truth and/or reference algorithms that can use compute resources for producing best-quality images.

It is contemplated that there may often be a trade-off between different image quality aspects and achieving high-quality reference images. For example, traditionally, spatial noise reduction may be difficult to achieve because of any trade-off between detail preservation and noise; however, in one embodiment, as illustrated in FIG. 3C, by controlling the raw capture, reference images may be created for each of the blocks and/or functionalities in ISP.

As illustrated in FIG. 3C, reference images 347 are generated for any spatial noise reduction (e.g., Luma, Chroma, Bayer, etc.) by capturing static scenes from input images 341, such as using a tripod, to ensure there is no global motion. These input images 341 are passed through pre-pipe 343 to then perform temporal fusion 345 with a different number of frames using user-provided preferences 348, regions of interest (ROIs) and labels 349, etc., about noise reduction strength on each area of an image (e.g., more noise reduction on flat), which then produces output reference images 347.

Figure 3D:
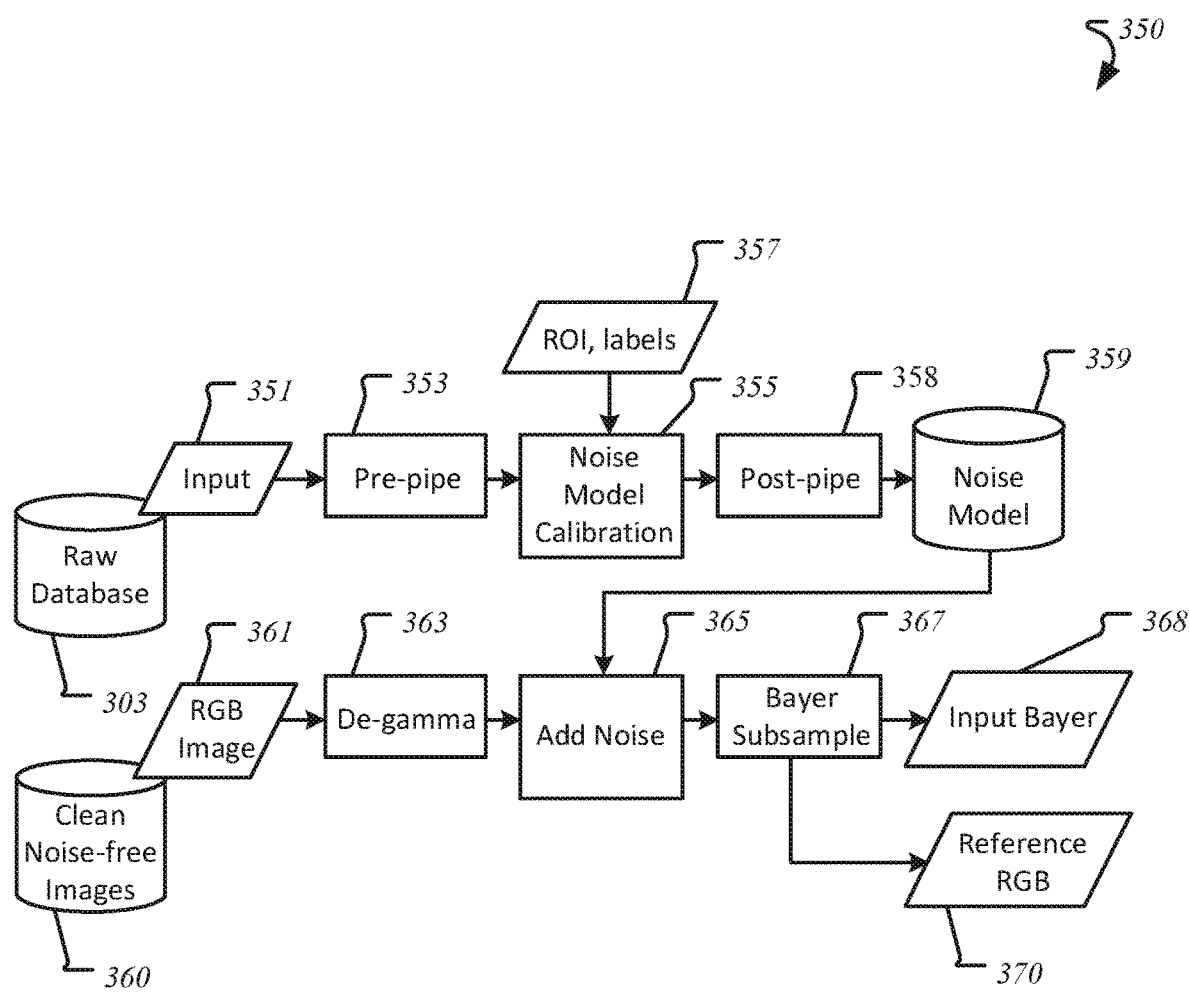
FIG. 3D illustrates a transaction sequence for reference generation for demosaic according to one embodiment.

Similarly, as illustrated in transaction sequence 350 of FIG. 3D, generation of reference images for any demosaic may include: calibrating noise using clean noise images at noise database 360 by running pre-pipe 353 on images input 351 obtained from raw database 303 and then fitting a model into noise statistics using color checker, such as through noise model calibration 355 using user-provided ROIs and labels 357, through post-pipe 358, so that noise model 359 is crated and provided as added noise 365 for further processing.

In one embodiment, transaction sequence 350 continues with the creation of reference red green blue (RGB) image 370 and its Bayer input 368 by preparing clean noise-free RGB images 361 (e.g., ×4 down-sample) through applying de-gamma 363 and adding noise 365 using noise model 359 (e.g., reference RGB image for demosaic) and Bayer sub-sample 367 (e.g., input Bayer that aligns with reference RGB image).

Figure 3E:
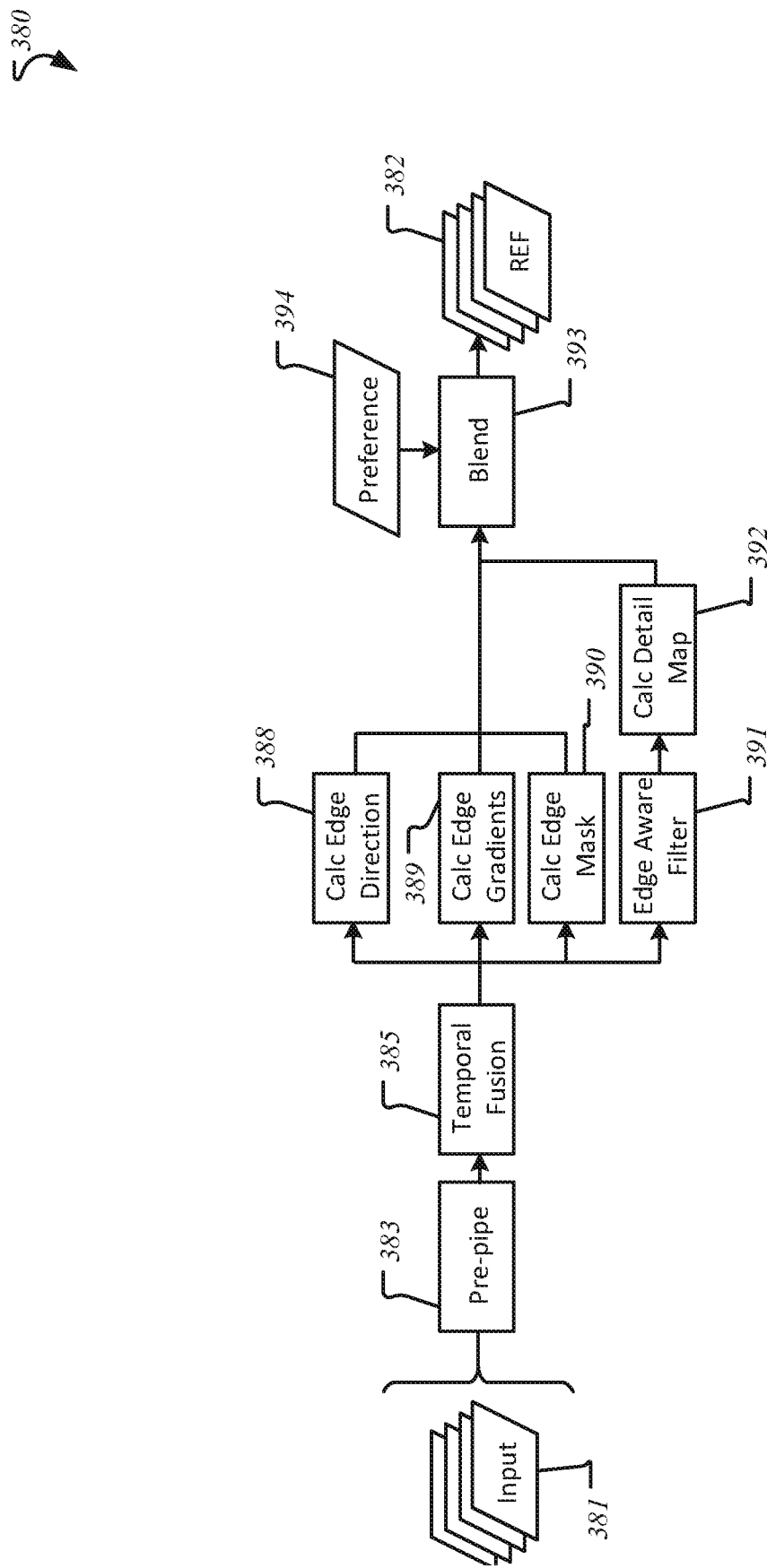
FIG. 3E illustrates a transaction sequence for reference generation for sharpening according to one embodiment.

Further, as illustrated in transaction sequence 380 of FIG. 3E, reference image generation for sharpening may include receiving input images 381, passed through pre-pipe 383, and then performing temporary fusion 385 of input images 381 to ensure edge smoothness of any contrast. In one embodiment, transaction sequence 380 continues with calculation and extraction of edge direction 388, gradients 389, edge mask 390, from a clean image of images 381, through edge aware filter 391, and extracting non-directional detail layer 392 also from this clean image. In one embodiment, transaction sequence 380 continues with blending 393 of a clean direction and/or non-direction detail layer and adding it back to input images 381, while reducing noise or and/or amplifying direction and/or non-direction edges based on user-provided preferences 394, resulting in generation of references 382 for sharpening.

Figure 3F:
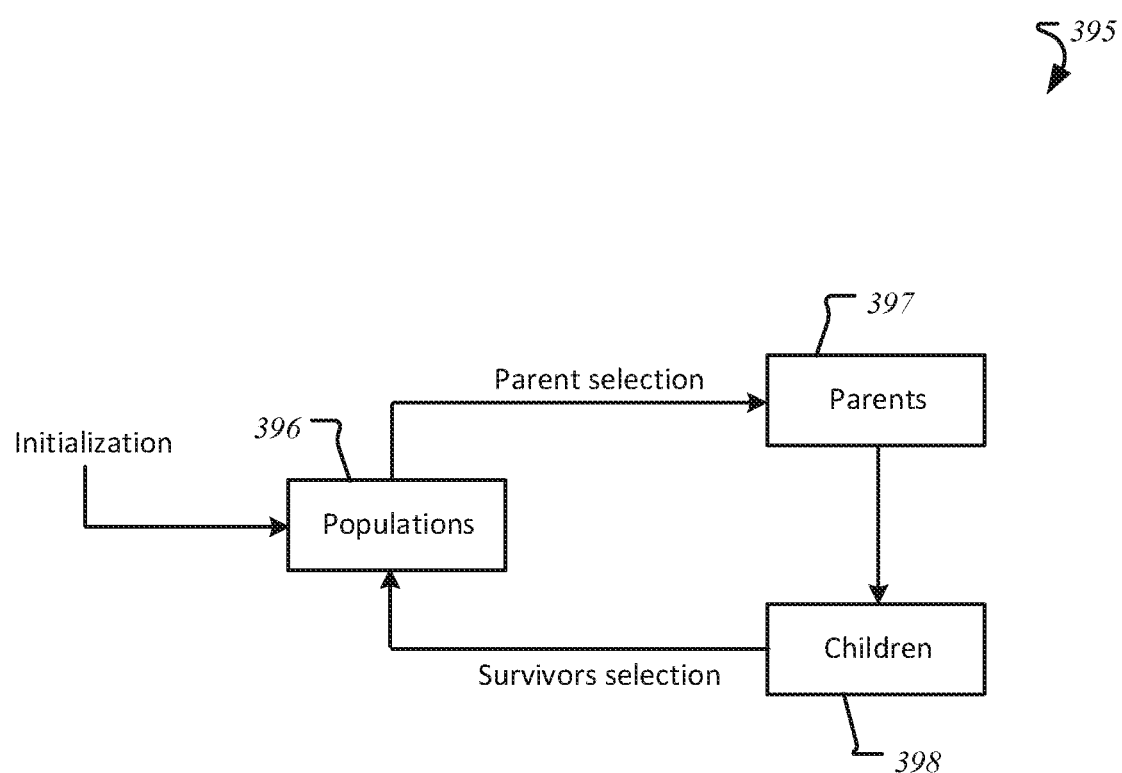
FIG. 3F illustrates a transaction sequence for optimization according to one embodiment.

Now referring to transaction sequence 395 of FIG. 3F, as previously discussed, in one embodiment, a technique based on an evolution algorithm may be used in connection with global and/or local optimization. For example, with respect to global optimization, since the search space is highly non-convex, any local optimization methods (e.g., gradient, approximately gradient-based, gradient-free, etc.) may not be suitable. However, in this case, in one embodiment, transaction sequence 395 for facilitating evolutionary process may be used and leveraged such that no global optimization algorithm is needed to rely on any analytical gradient of the cost function.

As illustrated, initialization is performed on populations 396, where parents 397 and children 398 are obtained through parent selection and survivor selection, respectively. Once the global optimization is performed, local optimization may then be needed to be performed. For example, the first process may be used for exploring the search space to get different candidates, while a global optimization algorithm may then be used to match to or at least get close to matching the optimal convergence to the global and/or local minima FIG. 4A illustrates an ISP 311 for automatic tuning using ISP intermediate references according to one embodiment. For brevity, many of the details previously discussed with reference to FIGS. 1-3F may not be discussed or repeated hereafter. Any processes or transactions with this and other illustrations may be performed by processing logic that may comprise hardware (e.g., circuitry, dedicated logic, programmable logic, etc.), software (such as instructions run on a processing device), or a combination thereof, as facilitated by reference-based tuning mechanism 110 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

In the illustrated embodiment, ISP 311 is globally and locally optimized by providing ideal reference images 411, 413, 415, 417 for each functionality of ISP 311 for facilitating automatic tuning of ISP 311 from raw input images 401 to final output images 403 through these intermediate reference images 411, 413, 415, 417. For example, as illustrated here as well as with reference to FIG. 3A, ISP 311 may contain several blocks, such as Demosaic, chroma noise reduction, sharpening, etc., such that any intermediary points 315A, 315B, 425, 427 are used as output points, where any outputting images at these intermediate points 315A, 315B, 425 and 427 are compared to their correspondingly-generated reference images 411, 413, 415, and 417.

Figure 4B:
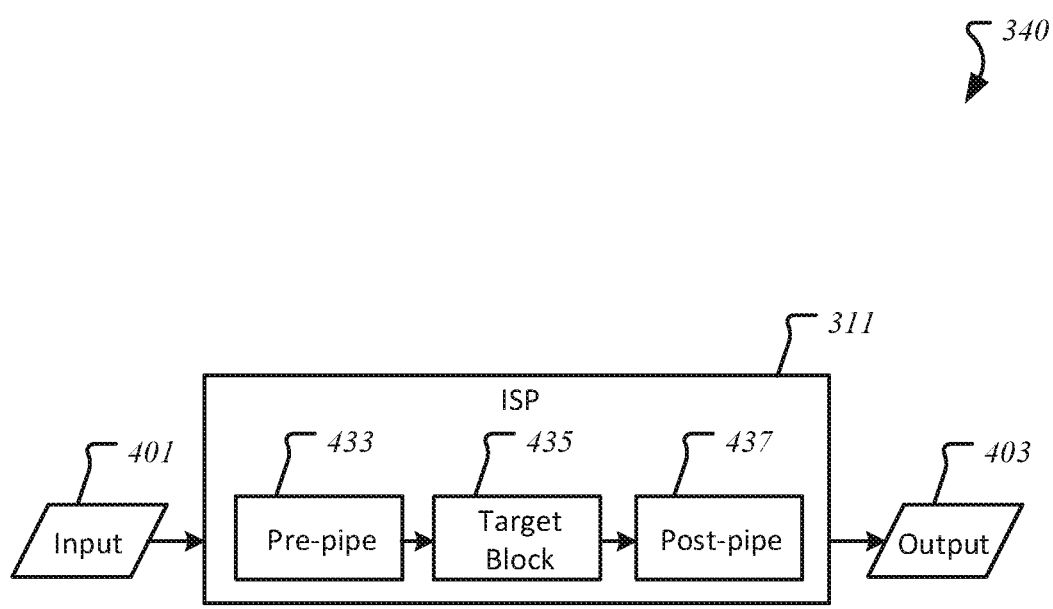
FIG. 4B illustrates an ISP pipeline having a pre-pipe and a post-pipe according to one embodiment.

In one embodiment, as illustrated in FIG. 4B, the transaction sequence for ISP 311 of FIG. 4A is facilitated though ISP 311 having pre-pipe 433, target block 435, and post-pipe 437 to receive raw input images 401 and final output images 403.

Figure 4C:
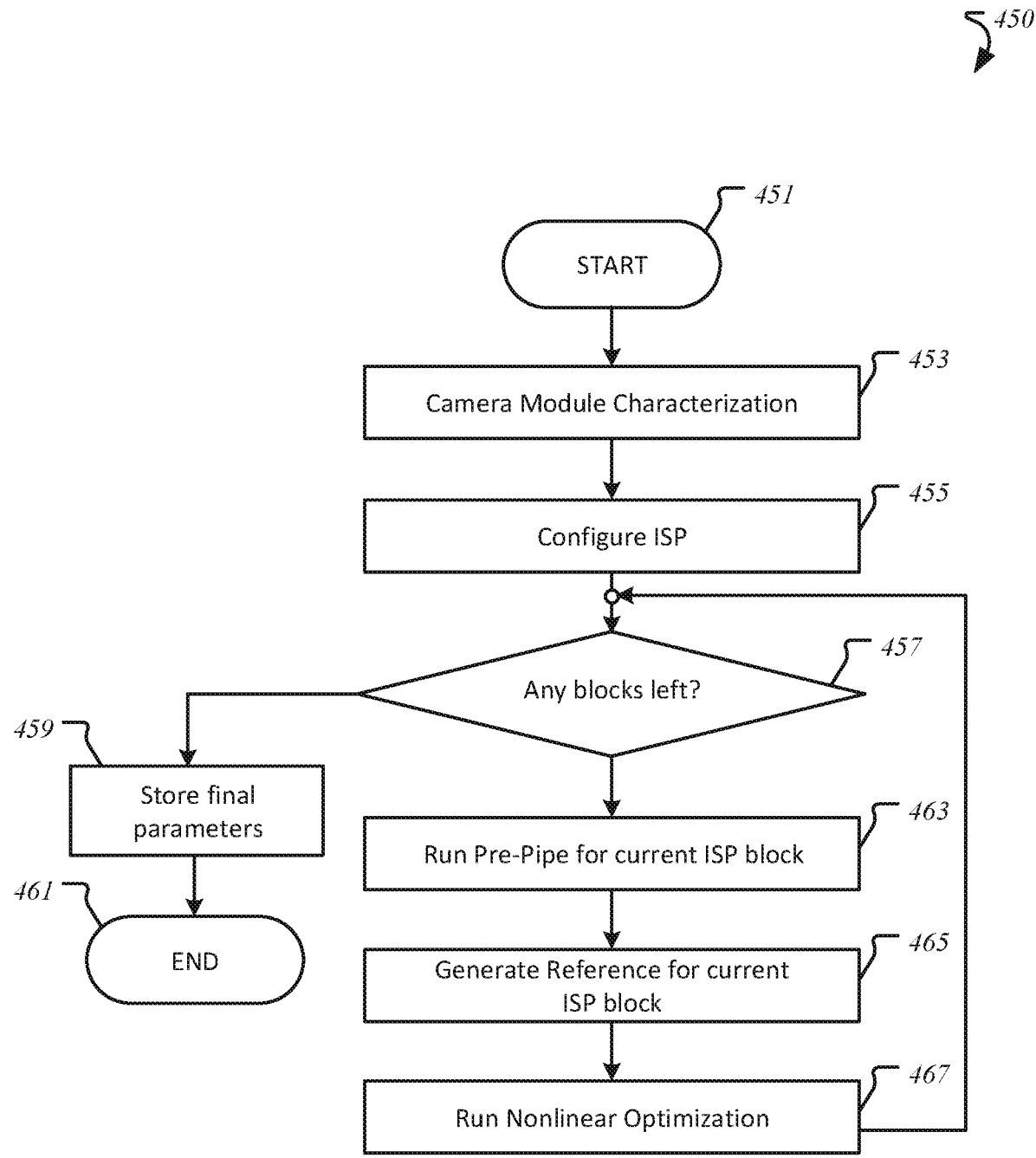
FIG. 4C illustrates a method for facilitating automatic tuning of ISP using generated reference images according to one embodiment.

FIG. 4C illustrates a method 450 for facilitating automatic tuning of ISPs using generated reference images according to one embodiment. For brevity, many of the details previously discussed with reference to FIGS. 1-4B may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by reference-based tuning mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 450 begins at block 451 with camera module characterization at block 453 for tuning of an ISP is performed using certain starting points maintained at a history database, where the starting points include tuning settings from. other sensor gain, previous tuning results, etc.). At block 453, the ISP is configured at block 455, while at block 457, a determination is made as to whether there are any blocks left. If not, the final parameters are stored at a database at block 459 and method 450 ends at block 461. If, however, there are block left, then a pre-pipe is run for a current ISP block at block 463, while reference image for a current ISP block is generated at block 465 and subsequently, nonlinear optimization is run at block 467 and further described with reference to FIG. 4D.

Figure 4D:
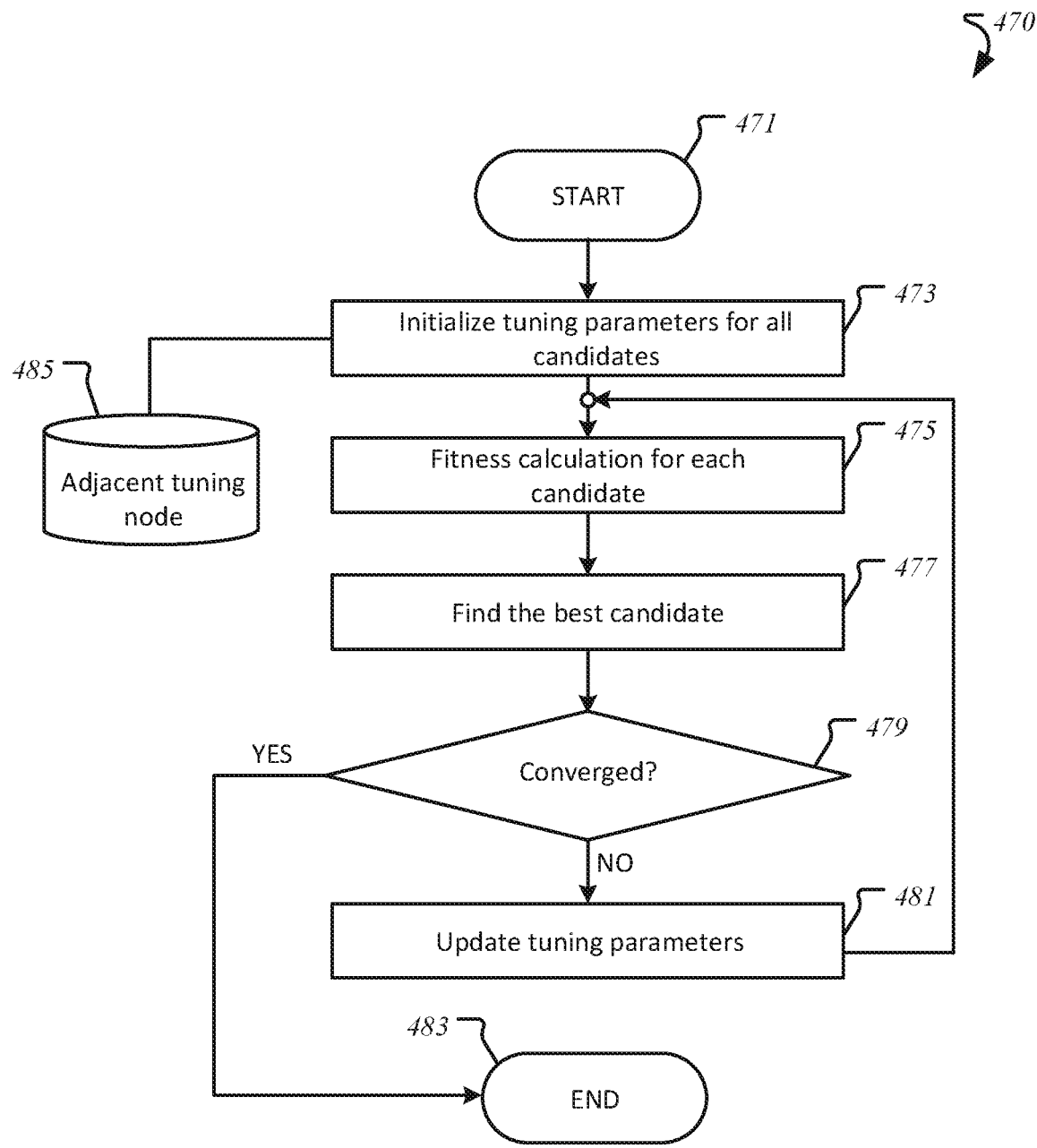
FIG. 4D illustrates a method for facilitating nonlinear optimization for automatic tuning of ISP using generated reference images.

FIG. 4D illustrates a method 470 for facilitating nonlinear optimization for automatic tuning of ISPs using generated reference images according to one embodiment. For brevity, many of the details previously discussed with reference to FIGS. 1-4C may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by reference-based tuning mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 470 starts at block 471 with initialization of tuning parameters for all candidates (e.g., images, raw images) at block 473, where some of the historical data is obtained from or accessed at adjacent tuning node 485, such as tuning settings, sensor gains, tuning parameters, previous tuning results, previously-generated reference images, etc. At block 475, fitness calculation for a candidate, such as an image, including, in some embodiments, a raw image, is performed, such as by comparing the raw images and their properties with generated reference images and their properties, the best candidate is selected at block 477. In one embodiment, at block 479, a determination is made as to whether there is convergence between the selected candidates and the reference images. If there is convergence, method 470 ends at block 483. If the convergence is lacking, then the tuning parameters are updated in accordance with the new information at block 481, stored at a database, such as adjacent tuning node 485, and communicated back to be used for fitness calculation for each candidate at block 475.

Figure 5:
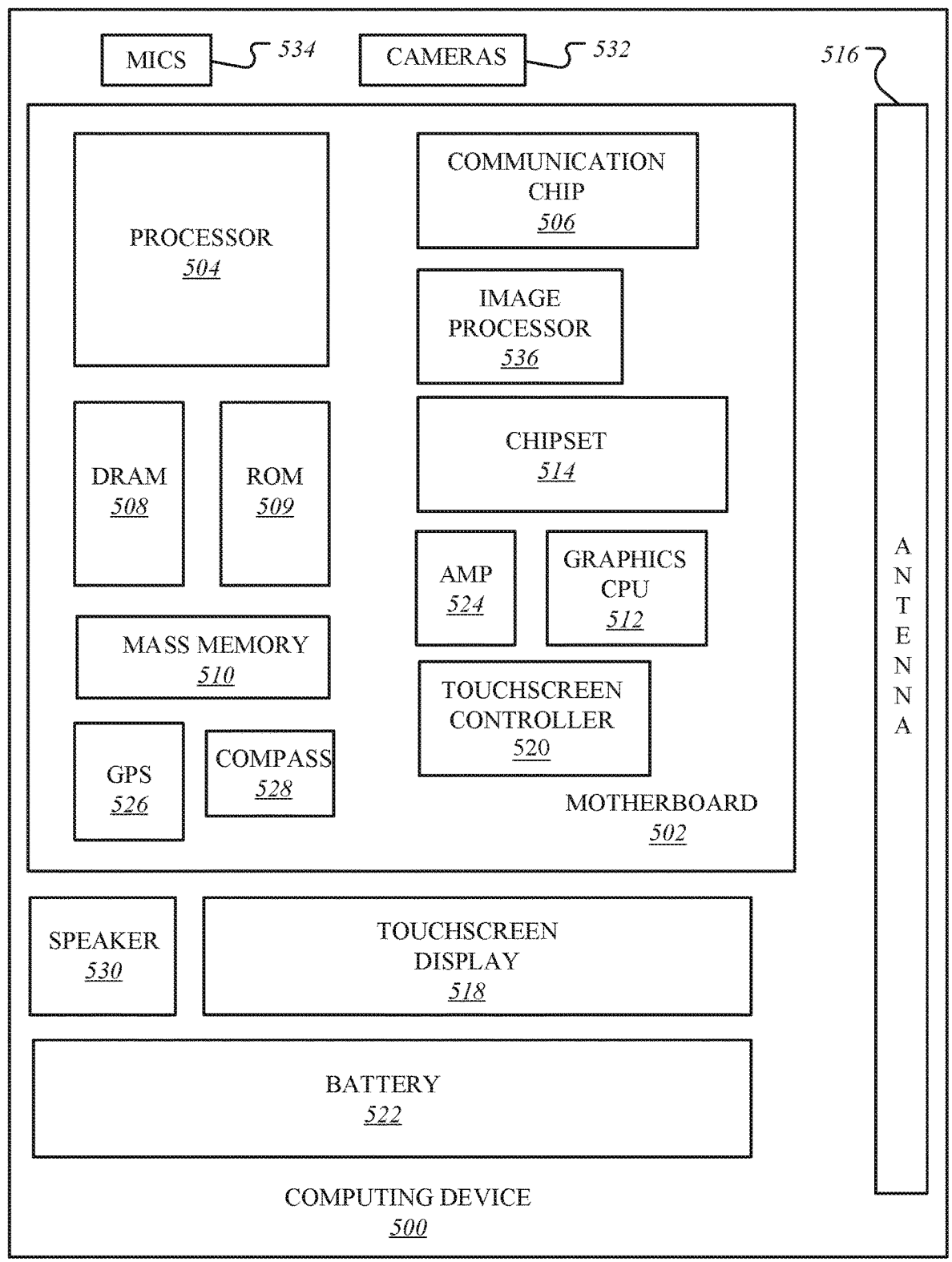
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 518, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
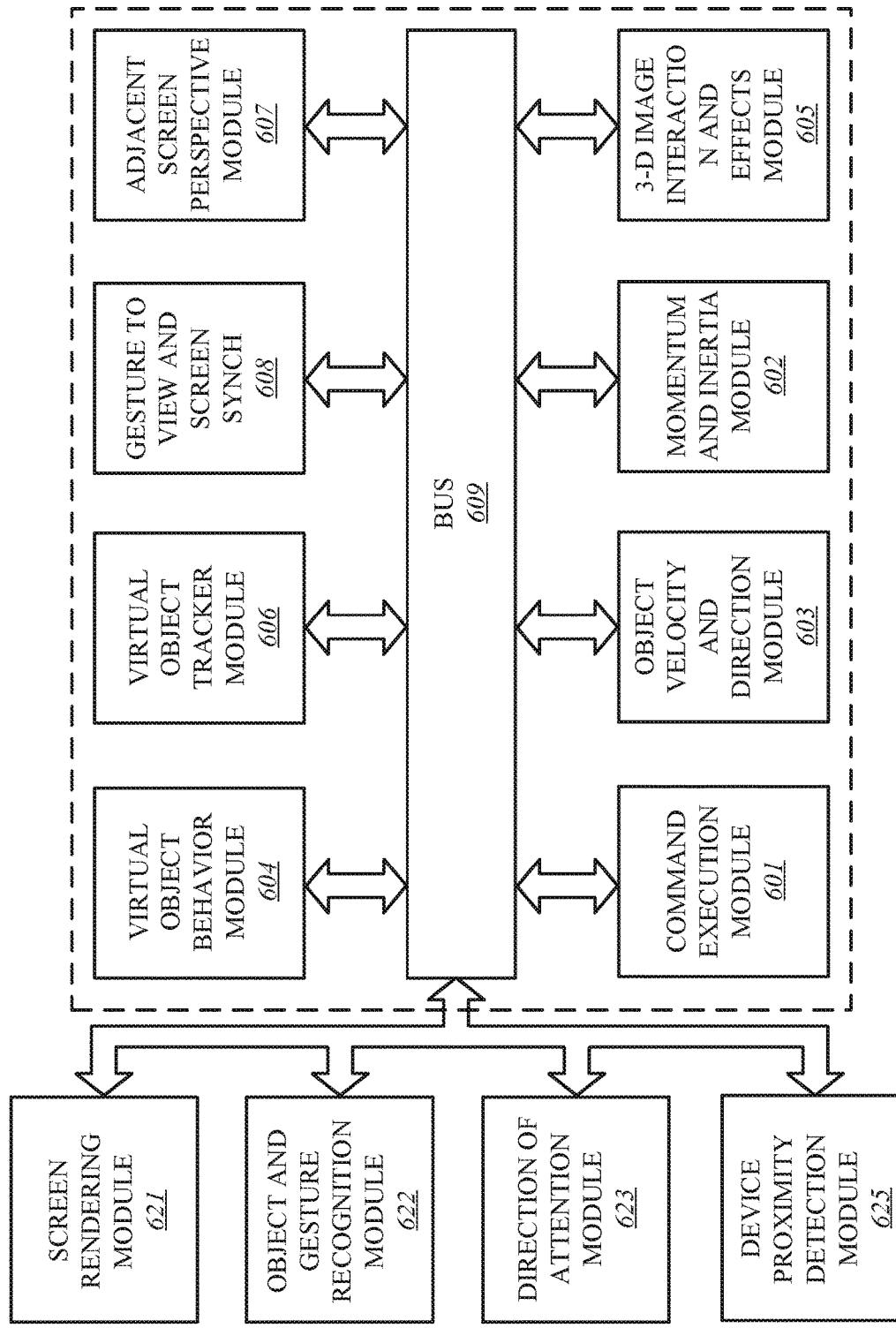
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate automatic tuning of image signal processors using reference images in image processing environments, the apparatus comprising: one or more processors to: receive images associated with one or more scenes captured by one or more cameras; access tuning parameters associated with functionalities within an image signal processor (ISP) pipeline; generate reference images based on the tuning parameters, wherein a reference image is associated with an image for each functionality within the ISP pipeline; and automatically tune the ISP pipeline based on selection of one or more of the reference images for one or more of the images for one or more of the functionalities.

Example 2 includes the subject matter of Example 1, wherein the one or more processors are further to: facilitate global optimization by searching for and accessing the tuning parameters at one or more databases to facilitate the selection of the one or more reference images as one or more suitable candidates for the one or more images for the one or more functionalities; and facilitate local optimization by refining the one or more reference images to match fitness measurements to pass as the one or more suitable candidates.

Example 3 includes the subject matter of Examples 1-2, wherein the one or more databases include history database and raw database, wherein the history database to store the tuning parameters and historical information including previous tuning settings, metadata associated with the tuning parameters, tuning ranges associated with the tuning parameters, and importance of the tuning parameters, wherein the raw database to maintain general information about the ISP, the tuning parameters, and the images.

Example 4 includes the subject matter of Examples 1-3, wherein the one or more processors are further to facilitate fitness calculation to measure each output image at each functionality with each reference image to determine closeness of properties between the images and the reference images such that the reference images are used to tune the tuning parameters so that the images match up with the reference images for the functionalities.

Example 5 includes the subject matter of Examples 1-4, wherein automatically tuning the ISP pipeline comprises tuning of the functionalities within the ISP pipeline, wherein the functionalities include one or more of noise reduction functionality, domsaic functionality, and sharpening functionality, wherein the noise reduction functionality includes one or more of Bayer noise reduction functionality and YUV noise reduction functionality.

Example 6 includes the subject matter of Examples 1-5, wherein the ISP pipeline is automatically tuned for image sensor gains such that a tuning setting for each image sensor gain is set to operate as a tuning node.

Example 7 includes the subject matter of Examples 1-6, wherein the one or more processors comprise one or more of a graphics processor and an application processor, wherein the graphics processor and the application processor are co-located on a common semiconductor package.

Some embodiments pertain to Example 8 that includes a method facilitating automatic tuning of image signal processors using reference images in image processing environments, the method comprising: receiving images associated with one or more scenes captured by one or more cameras; accessing tuning parameters associated with functionalities within an image signal processor (ISP) pipeline; generating reference images based on the tuning parameters, wherein a reference image is associated with an image for each functionality within the ISP pipeline; and automatically tuning the ISP pipeline based on selection of one or more of the reference images for one or more of the images for one or more of the functionalities.

Example 9 includes the subject matter of Example 8, further comprising: facilitating global optimization by searching for and accessing the tuning parameters at one or more databases to facilitate the selection of the one or more reference images as one or more suitable candidates for the one or more of the images for the one or more functionalities; and facilitating local optimization by refining the one or more reference images to match fitness measurements to pass as the one or more suitable candidates.

Example 10 includes the subject matter of Examples 8-9, wherein the one or more databases include history database and raw database, wherein the history database to store the tuning parameters and historical information including previous tuning settings, metadata associated with the tuning parameters, tuning ranges associated with the tuning parameters, and importance of the tuning parameters, wherein the raw database to maintain general information about the ISP, the tuning parameters, and the images.

Example 11 includes the subject matter of Examples 8-10, further comprising facilitating fitness calculation to measure each output image at each functionality with each reference image to determine closeness of properties between the images and the reference images such that the reference images are used to tune the tuning parameters so that the images match up with the reference images for the functionalities.

Example 12 includes the subject matter of Examples 8-11, wherein automatically tuning the ISP pipeline comprises tuning of the functionalities within the ISP pipeline, wherein the functionalities include one or more of noise reduction functionality, domsaic functionality, and sharpening functionality, wherein the noise reduction functionality includes one or more of Bayer noise reduction functionality and YUV noise reduction functionality.

Example 13 includes the subject matter of Examples 8-12, wherein the ISP pipeline is automatically tuned for image sensor gains such that a tuning setting for each image sensor gain is set to operate as a tuning node.

Example 14 includes the subject matter of Examples 8-13, wherein the method is facilitated by a computing device having one or more processors comprising one or more of a graphics processor and an application processor, wherein the graphics processor and the application processor are co-located on a common semiconductor package of the computing device.

Some embodiments pertain to Example 15 that includes a data processing system comprising a processing device to: receive images associated with one or more scenes captured by one or more cameras; access tuning parameters associated with functionalities within an image signal processor (ISP) pipeline; generate reference images based on the tuning parameters, wherein a reference image is associated with an image for each functionality within the ISP pipeline; and automatically tune the ISP pipeline based on selection of one or more of the reference images for one or more of the images for one or more of the functionalities; and a memory communicatively coupled to the processing device.

Example 16 includes the subject matter of Example 15, wherein the processing device is further to: facilitate global optimization by searching for and accessing the tuning parameters at one or more databases to facilitate the selection of the one or more reference images as one or more suitable candidates for the one or more of the images for the one or more functionalities; and facilitate local optimization by refining the one or more reference images to match fitness measurements to pass as the one or more suitable candidates.

Example 17 includes the subject matter of Examples 15-16, wherein the one or more databases include history database and raw database, wherein the history database to store the tuning parameters and historical information including previous tuning settings, metadata associated with the tuning parameters, tuning ranges associated with the tuning parameters, and importance of the tuning parameters, wherein the raw database to maintain general information about the ISP, the tuning parameters, and the images.

Example 18 includes the subject matter of Examples 15-17, wherein the processing device is further to: facilitate fitness calculation to measure each output image at each functionality with each reference image to determine closeness of properties between the images and the reference images such that the reference images are used to tune the tuning parameters so that the images match up with the reference images for the functionalities.

Example 19 includes the subject matter of Examples 15-18, wherein automatically tuning the ISP pipeline comprises tuning of the functionalities within the ISP pipeline, wherein the functionalities include one or more of noise reduction functionality, domsaic functionality, and sharpening functionality, wherein the noise reduction functionality includes one or more of Bayer noise reduction functionality and YUV noise reduction functionality.

Example 20 includes the subject matter of Examples 15-19, wherein the ISP pipeline is automatically tuned for image sensor gains such that a tuning setting for each image sensor gain is set to operate as a tuning node.

Example 21 includes the subject matter of Examples 15-20, wherein the processing device comprises one or more of a graphics processor and an application processor, wherein the graphics processor and the application processor are co-located on a common semiconductor package of the data processing system.

Some embodiments pertain to Example 22 that includes an apparatus facilitating automatic tuning of image signal processors using reference images in image processing environments, the apparatus comprising: means for receiving images associated with one or more scenes captured by one or more cameras; means for accessing tuning parameters associated with functionalities within an image signal processor (ISP) pipeline; means for generating reference images based on the tuning parameters, wherein a reference image is associated with an image for each functionality within the ISP pipeline; and means for automatically tuning the ISP pipeline based on selection of one or more of the reference images for one or more of the images for one or more of the functionalities.

Example 23 includes the subject matter of Example 22, further comprising: means for facilitating global optimization by searching for and accessing the tuning parameters at one or more databases to facilitate the selection of the one or more reference images as one or more suitable candidates for the one or more of the images for the one or more functionalities; and means for facilitating local optimization by refining the one or more reference images to match fitness measurements to pass as the one or more suitable candidates.

Example 24 includes the subject matter of Examples 22-23, wherein the one or more databases include history database and raw database, wherein the history database to store the tuning parameters and historical information including previous tuning settings, metadata associated with the tuning parameters, tuning ranges associated with the tuning parameters, and importance of the tuning parameters, wherein the raw database to maintain general information about the ISP, the tuning parameters, and the images.

Example 25 includes the subject matter of Examples 22-24, further comprising means for facilitating fitness calculation to measure each output image at each functionality with each reference image to determine closeness of properties between the images and the reference images such that the reference images are used to tune the tuning parameters so that raw images match up with the reference images for the functionalities.

Example 26 includes the subject matter of Examples 22-25, wherein the means for automatically tuning the ISP pipeline comprises means for tuning of the functionalities within the ISP pipeline, wherein the functionalities include one or more of noise reduction functionality, domsaic functionality, and sharpening functionality, wherein the noise reduction functionality includes one or more of Bayer noise reduction functionality and YUV noise reduction functionality.

Example 27 includes the subject matter of Examples 22-26, wherein the ISP pipeline is automatically tuned for image sensor gains such that a tuning setting for each image sensor gain is set to operate as a tuning node.

Example 28 includes the subject matter of Examples 22-27, wherein the apparatus comprises one or more processors including one or more of a graphics processor and an application processor, wherein the graphics processor and the application processor are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors having a reference and tuning mechanism comprising:
   detection and observation circuitry to receive images associated with one or more scenes captured by one or more cameras; and
   reference-based tuning engine to
   access tuning parameters associated with functionalities within an image signal processor (ISP) pipeline;
   generate reference images based on the tuning parameters, wherein a reference image is associated with an image for each functionality within the ISP pipeline; and
   automatically tune the ISP pipeline based on selection of one or more of the reference images for one or more of the images for one or more of the functionalities.

2. The apparatus of claim 1, wherein the reference and tuning mechanism further comprises optimization circuitry to:
   facilitate global optimization by searching for and accessing the tuning parameters at one or more databases to facilitate the selection of the one or more reference images as one or more suitable candidates for the one or more images for the one or more functionalities; and
   facilitate local optimization by refining the one or more reference images to match fitness measurements to pass as the one or more suitable candidates.

3. The apparatus of claim 1, wherein the reference and tuning mechanism further comprises characterization and calculation circuitry to facilitate fitness calculation to measure each output image at each functionality with each reference image to determine closeness of properties between the images and the reference images such that the reference images are used to tune the tuning parameters so that the images match up with the reference images for the functionalities.

4. The apparatus of claim 1, wherein automatically tuning the ISP pipeline comprises tuning of the functionalities within the ISP pipeline, wherein the functionalities include one or more of noise reduction functionality, domsaic functionality, and sharpening functionality, wherein the noise reduction functionality includes one or more of Bayer noise reduction functionality and YUV noise reduction functionality.

5. The apparatus of claim 1, wherein the one or more processors comprise one or more of a graphics processor and an application processor, wherein the graphics processor and the application processor are co-located on a common semiconductor package.

6. The apparatus of claim 2, wherein the one or more databases include history database and raw database, wherein the history database to store the tuning parameters and historical information including previous tuning settings, metadata associated with the tuning parameters, tuning ranges associated with the tuning parameters, and importance of the tuning parameters, wherein the raw database to maintain general information about the ISP, the tuning parameters, and the images.

7. The apparatus of claim 4, wherein the ISP pipeline is automatically tuned for image sensor gains such that a tuning setting for each image sensor gain is set to operate as a tuning node.

8. A method comprising:
receiving images associated with one or more scenes captured by one or more cameras;
accessing tuning parameters associated with functionalities within an image signal processor (ISP) pipeline;
generating reference images based on the tuning parameters, wherein a reference image is associated with an image for each functionality within the ISP pipeline; and
automatically tuning the ISP pipeline based on selection of one or more of the reference images for one or more of the images for one or more of the functionalities.

9. The method of claim 8, further comprising:
facilitating global optimization by searching for and accessing the tuning parameters at one or more databases to facilitate the selection of the one or more reference images as one or more suitable candidates for the one or more images for the one or more functionalities; and
facilitating local optimization by refining the one or more reference images to match fitness measurements to pass as the one or more suitable candidates.

10. The method of claim 8, further comprising facilitating fitness calculation to measure each output image at each functionality with each reference image to determine closeness of properties between the images and the reference images such that the reference images are used to tune the tuning parameters so that the images match up with the reference images for the functionalities.

11. The method of claim 8, wherein automatically tuning the ISP pipeline comprises tuning of the functionalities within the ISP pipeline, wherein the functionalities include one or more of noise reduction functionality, domsaic functionality, and sharpening functionality, wherein the noise reduction functionality includes one or more of Bayer noise reduction functionality and YUV noise reduction functionality.

12. The method of claim 8, wherein the method is facilitated by a computing device having one or more processors comprising one or more of a graphics processor and an application processor, wherein the graphics processor and the application processor are co-located on a common semiconductor package of the computing device.

13. The method of claim 9, wherein the one or more databases include history database and raw database, wherein the history database to store the tuning parameters and historical information including previous tuning settings, metadata associated with the tuning parameters, tuning ranges associated with the tuning parameters, and importance of the tuning parameters, wherein the raw database to maintain general information about the ISP, the tuning parameters, and the images.

14. The method of claim 11, wherein the ISP pipeline is automatically tuned for image sensor gains such that a tuning setting for each image sensor gain is set to operate as a tuning node.

15. At least one non-transitory computer-readable medium comprising instructions which, when executed by a computing device, cause the computing device to perform operations comprising:
receiving images associated with one or more scenes captured by one or more cameras;
accessing tuning parameters associated with functionalities within an image signal processor (ISP) pipeline;
generating reference images based on the tuning parameters, wherein a reference image is associated with an image for each functionality within the ISP pipeline; and
automatically tuning the ISP pipeline based on selection of one or more of the reference images for one or more of the images for one or more of the functionalities.

16. The non-transitory computer-readable medium of claim 15, wherein the operations further comprise:
facilitating global optimization by searching for and accessing the tuning parameters at one or more databases to facilitate the selection of the one or more reference images as one or more suitable candidates for the one or more images for the one or more functionalities; and
facilitating local optimization by refining the one or more reference images to match fitness measurements to pass as the one or more suitable candidates.

17. The non-transitory computer-readable medium of claim 15, wherein the operations further comprise facilitating fitness calculation to measure each output image at each functionality with each reference image to determine closeness of properties between the images and the reference images such that the reference images are used to tune the tuning parameters so that the images match up with the reference images for the functionalities.

18. The non-transitory computer-readable medium of claim 15, wherein automatically tuning the ISP pipeline comprises tuning of the functionalities within the ISP pipeline, wherein the functionalities include one or more of noise reduction functionality, domsaic functionality, and sharpening functionality, wherein the noise reduction functionality includes one or more of Bayer noise reduction functionality and YUV noise reduction functionality.

19. The non-transitory computer-readable medium of claim 15, wherein the computing device comprises one or more processors including one or more of a graphics processor and an application processor, wherein the graphics processor and the application processor are co-located on a common semiconductor package of the computing device.

20. The non-transitory computer-readable medium of claim 16, wherein the one or more databases include history database and raw database, wherein the history database to store the tuning parameters and historical information including previous tuning settings, metadata associated with the tuning parameters, tuning ranges associated with the tuning parameters, and importance of the tuning parameters, wherein the raw database to maintain general information about the ISP, the tuning parameters, and the images.

21. The non-transitory computer-readable medium of claim 18, wherein the ISP pipeline is automatically tuned for image sensor gains such that a tuning setting for each image sensor gain is set to operate as a tuning node.

* * * * *